United States Patent Office 3,507,869
Patented Apr. 21, 1970

3,507,869
SUBSTITUTED THIAZOLES
William J. Houlihan and Robert E. Manning, Mountain Lakes, N.J., assignors to Sandoz-Wander, Inc., Hanover, N.J., a corporation of Delaware
No Drawing. Continuation-in-part of application Ser. No. 729,406, May 15, 1968. This application Feb. 27, 1969, Ser. No. 803,062
Int. Cl. C07d 51/46, 91/18, 91/26
U.S. Cl. 260—251                           19 Claims

ABSTRACT OF THE DISCLOSURE

Substituted thiazoles, e.g., 2 - chloroethyl - 3 - (3,4 - dimethylphenyl) - 5,6 - dihydroimidazo[2,1-b]thiazole hydrobromide, useful as antidepressants and anorectics.

---

This application is a continuation-in-part of application Ser. No. 729,406, filed May 15, 1968 and now abandoned. This invention relates to novel heterocyclic compounds. More specifically it relates to novel 3-phenyl and 3-substituted phenyl imidazo thiazoles and thiazolo pyrimidines, intermediates therefor, acid addition salts thereof and process for their preparation.

The thiazoles of the present invention may be represented by the formula

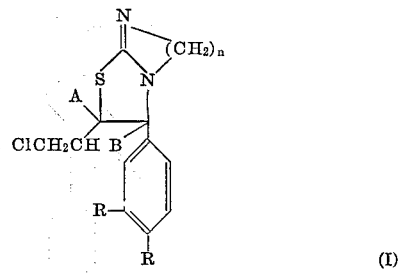

where each R, independently, represents H, halogen having an atomic weight of 19 to 36, or lower alkyl,
A is H, B is OH or A and B together represent a carbon to carbon bond, and
$n$ is 2 or 3.

The process for preparing compounds of Formula I where A and B represent a carbon to carbon bond may be represented as follows:

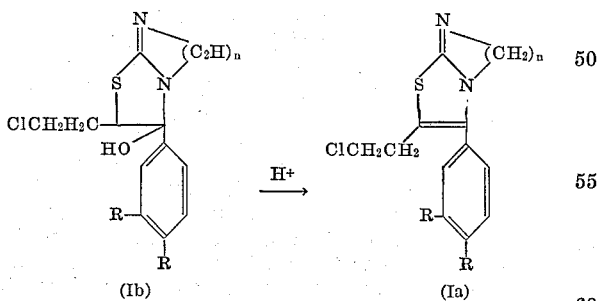

where R and $n$ have the above stated significance.

The thiazoles of Formula Ia are prepared from the compounds of Formula Ib or an acid addition salt thereof by treatment with an acid such as hydrochloric acid, hydrobromic acid and acetic acid (preferably acetic acid) at a temperature from about room temperature to about 100° C. preferably 50° C. to 70° C. The reaction may be performed in solvent but use of solvent and the particular solvent utilized is not considered crititcal. Solvents which may be used are lower alkanols such as ethanol, isopropanol and the like, acetone, tetrahydrofuran, and similar inert solvents.

Compounds of Formula Ib in HX acid addition salt form (Ic) may be prepared in accordance with the following reaction scheme:

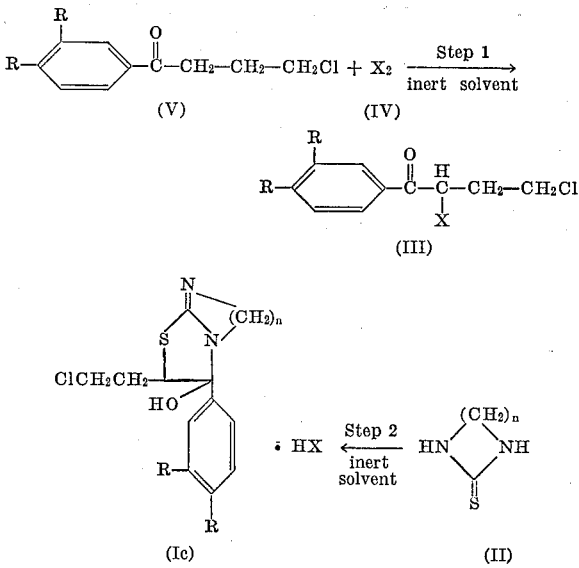

where R and $n$ have the above stated significance and X is Br or Cl.

The compounds of Formula Ic are prepared by halogenating a 4 - chlorobutyrophenone (V), e.g., 4 - chloro-3',4' - dimethylbutyrophenone, with bromine or chlorine (IV) in an inert solvent such as CHCl$_3$, CCl$_4$, CH$_2$Cl$_2$ and the like, at a temperature of 0°–50° C. (preferably 20°–35° C.) for about 1 to 8 hours. The resulting 2,4-dihalobutyrophenone (III) is treated with a 1,3-lower alkylene thiourea (II), e.g., 2-imidazoline thione in an inert solvent such as acetone or lower alkanols having 1 to 5 carbon atoms at a temperature of 20°–50° C. (preferably 25°–35° C.) for about 3 to 48 hours, to give the compounds of Formula Ib.

The compounds of Formula Ic above and the acid addition salts of the compounds of Formula I generally are converted to the corresponding free bases using conventional techniques, e.g., dissolution of the salt in water and precipitation using a base such as sodium carbonate.

The compounds of Formula Ib may also be illustrated by their tautomeric equivalents such as represented by the following structural formula

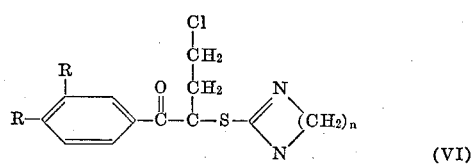

where each R and $n$ have the above-stated significance. In order to simplify this description, however, Formula Ib only will be used. It should be nevertheness understood that the compounds of Formula VI may be represented as well as the compounds of Formula Ib and both tautomeric forms are within the concept of the present invention.

Certain of the 4-chlorobutyrophenones (V) and 2,4-dihalobutyrophenones (III), above, are known and are prepared by methods disclosed in the literature. Those not specifically disclosed are prepared from known materials in an analogous manner.

The compounds of Formulas Ia and Ib are useful because they possess pharmacological activity in animals. More particularly, the compounds are useful as antidepressants as indicated by their activity in the mouse given parenterally 2.5–20 mg./kg. of body weight of active material. The test method used is basically as described by Spencer, P.S.J., Antagonism of Hypothemia in the Mouse by Antidepressants, in Antidepressant Drugs, pp. 194–204, Eds. S. Garattini and M. N. G. Dukes, Excerpta Medica Foundation, 1967.

Compounds of Formula Ia and Ib wherein n=2 are useful as anorexics as indicated by their activity in the rat given 25 mg./kg. of active material. The test method used is basically as described by Randall et al. (J.P.E.T., 129:163, 1960).

These compounds Ia and Ib may be combined with a pharmaceutically acceptable carrier or adjuvant. They may be administered orally or parenterally. The dosage will vary depending upon the mode of administration utilized and the particular compound employed.

These compounds of Formulas Ia and Ib may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results for antidepressant activity are obtained when the compounds are administrated at a daily dosage of from about 1 to 100 milligrams per kilogram of animal body weight. This daily dosage is preferably given in divided doses, e.g., 2 to 4 times a day, or in sustained release form. For most large animals, the total daily dosage is from about 35 to 750 milligrams and dosage forms suitable for internal administration comprise from about 8 to about 375 milligrams of the compound in admixture with a solid or liquid pharmaceutical carrier or diluent.

Satisfactory results for anorexic utility are obtained when the compounds are administered at a daily dosage of from about 1 to 100 milligrams per kilogram of animal body weight. This daily dosage is preferably given in divided doses, e.g., 2 to 4 times a day, or in sustained release form. For most large animals, the total daily dosage is from about 35 to 750 milligrams, and dosage forms suitable for internal administration comprise from about 8 milligrams to about 375 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
| --- | --- |
| 2-chloroethyl-3-(4-fluorophenyl)-5,6-dihydroimidazo[2,1-b]thiazole hydrobromide | 10 |
| Tragacanth | 2 |
| Lactose | 79.5 |
| Corn starch | 5 |
| Talcum | 3 |
| Magnesium stearate | 0.5 |

EXAMPLE 1

2-chloroethyl-3-phenyl-5,6-dihydroimidazo[2,1-b]thiazole hydrobromide

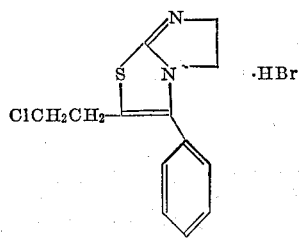

Step 1: 2-chloroethyl-3-hydroxy-3-phenyl-2,3,5,6-tetrahydroimidazo[2,1-b]thiazole hydrobromide. — A flask (equipped with a stirrer and dropping funnel) was charged with 60.0 g. (0.30 mole) of 4'-chlorobutyrophenone and 250 ml. of chloroform. The solution was stirred and a solution of 48.0 g. (16.0 ml., 0.3 mole) of bromine and 250 ml. of chloroform was added dropwise at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 2-imidazolinethione and 500 ml. of isopropanol. The reaction was exothermic and a solution resulted. In about one hour a solid came out of solution. Stirring was continued for 24 hours at room temperature at which time the resultant solid was filtered off to give 2-chloroethyl-3-hydroxy-3-phenyl-2,3,5,6-tetrahydroimidazo[2,1-b]thiazole hydrobromide, M.P. 162–3° C.; resolidified M.P. 208–9° C.

Step 2: 2-chloroethyl-3(phenyl)-5,6-dihydroimidazo[2,1-b]thiazole hydrobromide.—A mixture of 30 g. of 2-chloroethyl-3-hydroxy-3-phenyl-2,3,5,6-tetrahydroimidazolo[2,1-b]thiazolo hydrobromide and 250 ml. acetic acid was refluxed for 15 hours. The solvent was then removed in vacuo and the residue stirred with 100 ml. of isopropanol. The solid was filtered off to give 2-chloroethyl-3-(phenyl)-5,6-dihydroimidazo[2,1-b]thiazole hydrobromide, M.P. 195–200° C.

EXAMPLE 2

2-chloroethyl-3-(4-fluorophenyl)-5,6-dihydroimidazo-[2,1-b]thiazole hydrobromide

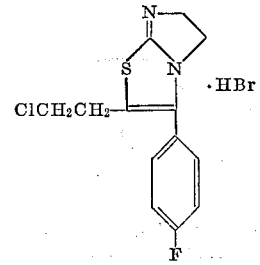

Step 1: 2-chloroethyl-3-(4-fluorophenyl)-3-hydroxy-2,3,5,6-tetrahydroimidazo[2,1-b]thiazole hydrobromide.— A flask (equipped with a stirrer and dropping funnel) was charged with 60.0 g. (0.30 mole) of 4-chloro-4'-fluorobutyrophenone and 250 ml. of chloroform. The solution was stirred and a solution of 48.0 g. (16.0 ml., 0.3 mole of bromine and 250 ml. of chloroform was added (dropwise) at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 2-imidazolinethione and 500 ml. of isopropanol. The reaction was exothermic and a solution resulted. In about one hour a solid came out of solution. Stirring was continued for 24 hours at room temperature at which time the resultant solid was filtered off to give 2-chloroethyl-3-(4-fluorophenyl)-3-hydroxy-2,3,5,6-tetrahydroimidazo[2,1-b]thiazole hydrobromide, M.P. 148–9° C.; resolidified M.P. 221–223° C.

Step 2: 2-chloroethyl-3-(4-fluorophenyl)-5,6-dihydroimidazo[2,1-b]thiazole hydrobromide.—A mixture of 30 g. of 2-chloroethyl-3-(4-fluorophenyl-3-hydroxy-2,3,5,6-tetrahydroimidazole[2,1-b]thiazolo hydrobromide and 250 ml. of acetic acid was refluxed for 15 hours. The solvent was then removed in vacuo and the residue stirred with 100 ml. of isopropanol. The solid was filtered off to give 2-chloroethyl-3-(4-fluoropheny)-5,6-dihydroimidazo[2,1-b]thiazole hydrobromide; M.P. 221–223° C. (dec.).

EXAMPLE 3

2-chloroethyl-3-(3,4-dimethylphenyl)-5,6-dihydro-imidazo[2,1-b]thiazole hydrobromide

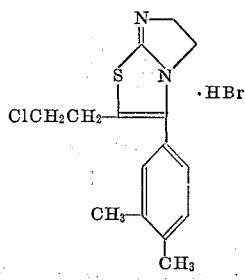

Step 1: 2-chloroethyl-3-(3',4'-dimethylphenyl) - 3 - hydroxy-2,3,5,6-tetrahydroimidazo[2,1-b]thiazole hydrobromide.—A flask (equipped with a stirrer and dropping funnel) was charged with 60.0 g. (0.30 mole) of 4-chloro-3',4'-dimethyl butyrophenone and 250 ml. of chloroform. The solution was stirred and a solution of 48.0 g. 16.0 ml., 0.3 mole) of bromine and 250 ml. of chloroform was added (dropwise) at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 2-imidazolinethione and 500 ml. of isopropanol. The reaction was exothermic and a solution resulted. In about one hour a solid came out of solution. Stirring was continued for 24 hours at room temperature at which time the resultant solid was filtered off to give 2-chloroethyl-(3',4'-dimethylphenyl)-3-hydroxy-2,3,5,6-tetrahydroimidazo[2,1-b]thiazole hydrobromide, M.P. 176–7° C.

Step 2: 2-chloroethyl-3-(3',4'-dimethylphenyl)-5,6-dihydroimidazo[2,1-b]thiazole hydrobromide.—A mixture of 30 g. of 2-chloroethyl-3-(3',4'-dimethylphenyl)-3-hydroxy-2,3,5,6-tetrahydroimidazolo[2,1-b]thiazolo hydrobromide and 250 ml. acetic acid was refluxed for 15 hours. The solvent was then removed in vacuo and the residue stirred with 100 ml. of isopropanol. The solid was filtered off to give 2-chloroethyl-3-(3'-4'-dimethylphenyl)-5,6-dihydroimidazo[2,1-b]thiazole hydrobromide, M.P. 181–2° C.

EXAMPLE 4

2-chloroethyl-3-(phenyl)-6,7-dihydro-5H-thiazolo[3,2-a]pyrimidine hydrobromide

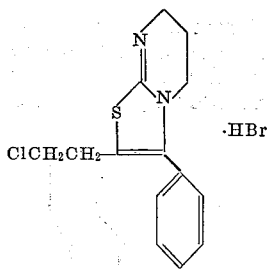

Step: 1 2-chloroethyl-3-hydroxy-3-phenyl-2,3,6,7-tetrahydro-5H-thiazolo[3,2 - a]pyrimidine hydrobromide.— A flask (equipped with a stirrer and dropping funnel) was charged with 60.0 g. (0.30 mole) of 4-chlorobutyrophenone and 250 ml. of chloroform. The solution was stirred and a solution of 48.0 g. (16.0 ml., 0.3 mole) of bromine and 250 ml. of chloroform was added (dropwise) at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 3,4,5,6-tetrahydro-2-pyrimidinethiol and 500 ml. of isopropanol. The reaction was exothermic and a solution resulted. In about one hour a solid came out of solution. Stirring was continued for 24 hours at room temperature at which time the resultant solid was filtered off to give 2-chloroethyl-3-hydroxy - 3 - phenyl - 2,3,6,7 - tetrahydro - 5H - thiazolo-[3,2-a]pyrimidine hydrobromide, M.P. 167–6° C.; resolidified M.P. 210–11° C.

Step 2: 2-chloroethyl-3(phenyl)-6,7-dihydro-5H-thiazolo[3,2-a]pyrimidine hydrobromide.—A mixture of 30 g. of 2 - chloroethyl-3-hydroxy-3-phenyl-2,3,6,7-tetrahydro-5H-thiazolo[3,2-a]pyrimidine hydrobromide and 250 ml. acetic acid was refluxed for 15 hours. The solvent was then removed in vacuo and the residue stirred with 100 ml. of isopropanol. The solid was filtered off to give 2-chloroethyl - 3(phenyl) - 5,6-dihydro-5H-thiazolo[3,2-a] pyrimidine hydrobromide, M.P. 208–209° C.

EXAMPLE 5

2-chloroethyl-3(4-fluorophenyl)-6,7-dihydro-5H-thiazolo[3,2-a]pyrimidine hydrobromide

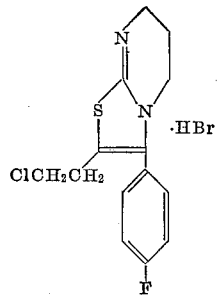

Step 1: 2 - chloroethyl-3-(4-fluorophenyl)-3-hydroxy-2,3,6,7 - tetrahydro-5H-thiazolo[3,2-a]pyrimidine hydrobromide.—A flask (equipped with a stirrer and dropping funnel) was charged with 60.0 g. (0.30 mole) of 4-chloro-4'-fluorobutyrophenone and 250 ml. of chloroform. The solution was stirred and a solution of 48.0 g. (16.0 ml., 0.3 mole) of bromine and 250 ml. of chloroform was added (dropwise) at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 3,4,5,6-tetrahydro-2-pyrimidinethiol and 500 ml. of isopropanol. The reaction was exothermic and a solution resulted. In about one hour a solid came out of solution, stirring was continued for 24 hours at room temperature at which the resultant solid was filtered off to give 2-chloroethyl-3-(4-fluorophenyl)-3-hydroxy - 2,3,5,6 - tetrahydro-5H-thiazolo[3,2-a]pyrimidine hydrobromide, M.P. 185–6° C.

Step 2: 2-chloroethyl-3-(4-fluorophenyl)-6,7-dihydro-5H-thiazolo[3,2-a]pyrimidine hydrobromide.—A mixture of 30 g. of 2-chloroethyl-3-(4-fluorophenyl)-3-hydroxy-2,3,6,7 - tetrahydro-5H-thiazolo[3,2-a]pyrimidine hydrobromide and 250 ml. acetic acid was refluxed for 15 hours. The solvent was then removed in vacuo and the residue stirred with 100 ml. of isopropanol. The solid was filtered to give 2-chloroethyl-3-(4-fluorophenyl)-6,7-dihydro-5H-thiazolo[3,2-a]pyrimidine hydrobromide, M.P. 185–6° C.

EXAMPLE 6

2-chloroethyl-3-(3,4-dimethylphenyl)-6,7-dihydro-5H-thiazolo[3,2-a]pyrimidine hydrobromide

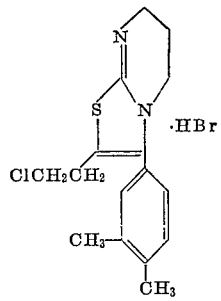

Step 1: 2 - chloroethyl-3-(3',4'-dimethylphenyl)-3-hyhydroxy - 2,3,6,7-tetrahydro-5H-thiazolo[3,2-a]pyrimidine hydrobromide.—A flask (equipped with a stirrer and dropping funnel) was charged with 60.0 g. (0.30 mole) of 4-chloro-3',4'-dimethylbutyrophenone and 250 ml. of chloroform. The solution was stirred and a solution of 48.0 g. (16.0 ml., 0.3 mole) of bromine and 250 ml. of chloroform was added (dropwise) at a rate such that the internal flask temperature did not exceed 35° C. The resulting solution was stirred for one hour and the solvent removed in vacuo. The residue was dissolved in 150 ml. of isopropanol and added in one portion to a slurry of 30.6 g. (0.30 mole) 3,4,5,6-tetrahydro-2-pyrimidinethiol and 500 ml. of isopropanol. The reaction was exothermic and a solution resulted. In about one hour a solid came out of solution. Stirring was continued for 24 hours at room temperature at which time the resultant solid was filtered off to give 2-chloroethyl-3-(3',4'-dimethylphenyl)-3 - hydroxy-2,3,6,7-tetrahydro-5H-thiazolo[3,2-a]pyrimidine hydrobromide, M.P. 186–187° C.

Step 2: 2-chloroethyl-3-(3',4'-dimethylphenyl)-6,7-dihydro - 5H - thiazolo[3,2-a]pyrimidine hydrobromide.—A mixture of 30 g. of 2-chloroethyl-3-(3',4'-dimethylphenyl) - 3-hydroxy-2,3,6,7-tetrahydro-5H-thiazolo[3,2-a]pyrimidine hydrobromide and 250 ml. acetic acid was refluxed for 15 hours. The solvent was then removed in vacuo and the residue stirred with 100 ml. of isopropanol. The solid was filtered off to give 2-chloroethyl-3-(3',4'-dimethylphenyl) - 6,7 - dihydro-5H-thiazolo[3,2-a]pyrimidine hydrobromide, M.P. 182–4° C.

What is claimed is:

1. A compound of the formula

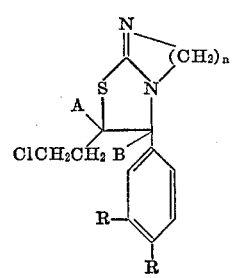

wherein each R independently represents H, halogen having an atomic weight of 19 to 36, or lower alkyl, A is H and B is OH or A and B together represent a carbon to carbon bond, $n$ is 2 or 3, or a pharmaceutically acceptable acid addition salt thereof.

2. A compound according to claim 1 of the formula

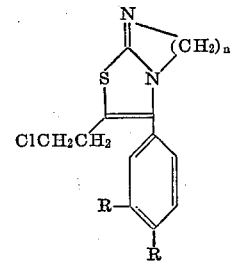

where each R independently represents H, halogen having an atomic weight of 19 to 36, or lower alkyl, $n$ is 2 or 3, or a pharmaceutically acceptable acid addition salt thereof.

3. A compound according to claim 1 of the formula

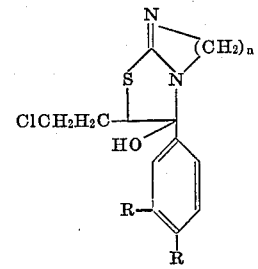

where each R independently represents H, halogen having an atomic weight of 19 to 36, or lower alkyl, $n$ is 2 or 3, or a pharmaceutically acceptable acid addition salt thereof.

4. A compound according to claim 2 of the formula

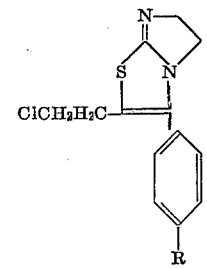

where each R independently represents H, halogen having an atomic weight of 19 to 36, or lower alkyl, or a pharmaceutically acceptable acid addition salt thereof.

5. A compound according to claim 2 of the formula

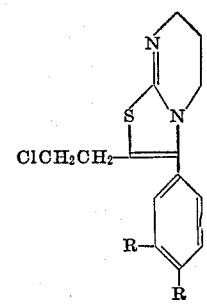

where each R independently represents H, halogen having an atomic weight of 19 to 36, or lower alkyl, or a pharmaceutically acceptable acid addition salt thereof.

6. A compound according to claim 3 of the formula

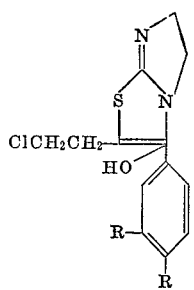

where each R independently represents H, halogen having an atomic weight of 19 to 36, or lower alkyl, or a pharmaceutically acceptable acid addition salt thereof.

7. A compound according to claim 3 of the formula

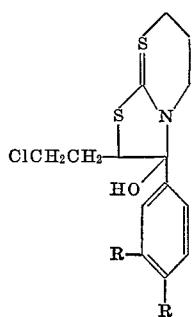

where each R independently represents H, halogen having an atomic weight of 19 to 36, or lower alkyl, or a pharmaceutically acceptable acid addition salt thereof.

8. The compound of claim 4 which is 2-chloroethyl-3-(phenyl)-5,6-dihydroimidazo[2,1-b]thiazole.

9. The compound of claim 4 which 2-chloroethyl-3-(4-fluorophenyl)-5,6-dihydroimidazo[2,1-b]thiazole.

10. The compound of claim 4 which is 2-chloroethyl-3-(3,4-dimethylphenyl)-5,6-dihydroimidazo[2,1 - b]thiazole.

11. The compound of claim 5 which is 2-chloroethyl-3-(phenyl)-6,7-dihydro-5H-thiazolo[3,2-a]pyrimidine.

12. The compound of claim 5 which is 2-chloroethyl-3-(4-fluorophenyl)-6,7-dihydro - 5H - thiazolo[3,2-a]pyrimidine.

13. The compound of claim 5 which is 2-chloroethyl-3-(3,4-dimethylphenyl) - 6,7 - dihydro-5H-thiazolo[3,2-a]pyrimidine.

14. The compound of claim 6 which is 2-chloroethyl-3-hydroxy - 3 - phenyl-2,3,5,6-tetrahydroimidazo[2,1-b]thiazole.

15. The compound of claim 6 which is 2-chloroethyl-3-(4-fluorophenyl) - 3 - hydroxy-2,3,5,6-tetrahydroimidazo[2,1-b]thiazole.

16. The compound of claim 6 which is 2-chloroethyl-3-(3',4' - dimethylphenyl) - 3 - hydroxy-2,3,5,6-tetrahydroimidazo[2,1-b]thiazole.

17. The compound of claim 7 which is 2-chloroethyl-3-hydroxy - 3 - phenyl-2,3,6,7-tetrahydro-5H-thiazolo[3,2-a]pyrimidine.

18. The compound of claim 7 which is 2-chloroethyl-3-(4-fluorophenyl) - 3 - hydroxy-2,3,6,7-tetrahydro-5H-thiazolo[3,2-a]pyrimidine.

19. The compound of claim 7 which is 2-chloroethyl-3-(3',4'-dimethylphenyl) - 3 - hydroxy-2,3,6,7-tetrahydro-5H-thiazolo[3,2-a]pyrimidine.

References Cited
UNITED STATES PATENTS 3,169,970  2/1965  Snyder _____ 260—306.8

NICHOLAS S. RIZZO, Primary Examiner

R. V. RUSH, Assistant Examiner

U.S. Cl. X.R.

260—306.7, 309.6; 424—251, 270